(12) United States Patent
Koszeghy et al.

(10) Patent No.: US 9,543,693 B2
(45) Date of Patent: Jan. 10, 2017

(54) HIGH-VOLTAGE ARRANGEMENT

(71) Applicant: Robert Bosch GmbH, Stuttgart (DE)

(72) Inventors: Gergely Nagy Koszeghy, Budapest (HU); Szilard Galambos, Szany (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/765,481

(22) PCT Filed: Jan. 27, 2014

(86) PCT No.: PCT/EP2014/051462
§ 371 (c)(1),
(2) Date: Aug. 3, 2015

(87) PCT Pub. No.: WO2014/118100
PCT Pub. Date: Aug. 7, 2014

(65) Prior Publication Data
US 2015/0364858 A1    Dec. 17, 2015

(30) Foreign Application Priority Data
Feb. 1, 2013 (DE) ........................ 10 2013 201 674

(51) Int. Cl.
*H01R 13/44* (2006.01)
*H01R 13/53* (2006.01)
(Continued)

(52) U.S. Cl.
CPC ................ *H01R 13/53* (2013.01); *B60L 3/04* (2013.01); *B60L 11/18* (2013.01); *H01R 13/447* (2013.01);
(Continued)

(58) Field of Classification Search
CPC .. H01R 13/447; H01R 13/4534; H01R 13/707
(Continued)

(56) References Cited

U.S. PATENT DOCUMENTS 3,141,713 A * 7/1964 Kauffman ........... A47L 15/4259
312/328
4,424,407 A * 1/1984 Barbic ................. H01R 13/447
174/67
(Continued)

FOREIGN PATENT DOCUMENTS

DE        614730      6/1935
DE        10252829    6/2004
(Continued)

OTHER PUBLICATIONS

International Search Report for Application No. PCT/EP2014/051462 dated Mar. 7, 2014 (English Translation, 2 pages).

*Primary Examiner* — Thanh Tam Le
(74) *Attorney, Agent, or Firm* — Michael Best & Friedrich LLP

(57) ABSTRACT

The invention relates to a high-voltage arrangement (1), preferably for a motor vehicle, comprising a housing (2), a high-voltage plug (4) arranged on the housing (2) for the insertion of a high-voltage mating plug (5), a cover (3) that can be mounted on the housing (2) and dismounted, and a spring device (6) comprising at least one first spring element (10) which, when the cover (3) is not mounted, blocks the high-voltage mating plug (5) from being inserted into the high-voltage plug (6), and said cover (3), when mounted, pushing said first spring element (10) down such that the high-voltage mating plug (5) may be inserted into the high-voltage plug (4).

17 Claims, 3 Drawing Sheets

(51) Int. Cl.
  *B60L 3/04*       (2006.01)
  *H01R 13/447*     (2006.01)
  *H01R 13/639*     (2006.01)
  *H01R 13/64*      (2006.01)
  *B60L 11/18*      (2006.01)

(52) U.S. Cl.
  CPC .......... *H01R 13/6397* (2013.01); *H01R 13/64* (2013.01); *H01R 2201/26* (2013.01); *Y02T 10/7005* (2013.01)

(58) Field of Classification Search
  USPC .................. 439/135, 136, 137, 142, 911
  See application file for complete search history.

(56) References Cited

U.S. PATENT DOCUMENTS

| | | | |
|---|---|---|---|
| 5,050,211 A * | 9/1991 | Dortu | F16P 3/08 379/438 |
| 5,504,655 A * | 4/1996 | Underwood | B60L 3/00 200/50.1 |
| 5,547,388 A * | 8/1996 | Hill | H01R 13/447 439/135 |
| 5,735,701 A | 4/1998 | Jarrett | |
| 5,769,646 A * | 6/1998 | Cavello | G06F 1/1616 439/136 |
| 6,851,958 B1 * | 2/2005 | Rowland | H01R 13/5213 439/142 |
| 7,044,780 B2 * | 5/2006 | Ma | H01R 13/639 439/553 |
| 7,207,812 B1 | 4/2007 | Wong | |
| 7,258,556 B1 * | 8/2007 | Boutros | H01R 13/4532 439/142 |
| 7,410,020 B2 * | 8/2008 | Kikuchi | H01R 4/44 180/68.5 |
| 7,717,751 B2 * | 5/2010 | Bellotto | H01R 12/7023 439/629 |
| 8,288,651 B2 * | 10/2012 | Smith | H01R 13/5205 174/135 |
| 2001/0000684 A1 | 5/2001 | Duesman et al. | |
| 2004/0092144 A1 | 5/2004 | Schmid et al. | |
| 2009/0197463 A1 | 8/2009 | Christoph et al. | |

FOREIGN PATENT DOCUMENTS

| | | |
|---|---|---|
| DE | 102005004189 | 8/2006 |
| DE | 102009032327 | 1/2011 |
| DE | 102010001411 | 8/2011 |

* cited by examiner

HIGH-VOLTAGE ARRANGEMENT

BACKGROUND OF THE INVENTION

The present invention relates to a high-voltage arrangement, for example a pulse inverter, preferably for a motor vehicle.

Different housings are known from the prior art, in which power electronics are situated. A high-voltage plug is usually configured on the housing. A high-voltage mating plug is connected to this high-voltage plug. A cover of the housing is arranged such that it can be dismounted in order to service or repair the power electronics. It must thereby always be ensured that the power electronics are deenergized respectively switched off if the cover is dismounted. Different systems, for example sensors, for detecting an open cover and thus for deenergizing or switching off the power electronics are known from the prior art.

SUMMARY OF THE INVENTION

The high-voltage arrangement according to the invention depicts a cost effective and low-maintenance system for ensuring that the power electronics are energized or switched on only when the cover is closed. This is achieved by a high-voltage arrangement, preferably for a motor vehicle, comprising a housing and a high-voltage plug arranged on the housing. The housing is particularly designed to accommodate power electronics, for example a pulse inverter. The high-voltage plug is used for the insertion of a high-voltage mating plug. The high-voltage arrangement further comprises a cover that can be mounted on the housing and dismounted. In the dismounted state of the cover, the housing is at least partially open so that the potential danger exists that service personnel will come in contact with power electronics subjected to high voltage. Within the scope of the present invention, a dismounted cover includes a cover which has been completely removed from the housing or one that has been, for example, only opened. The high-voltage arrangement further comprises a spring device comprising at least one first spring element. The first spring element is disposed such that said element is pushed down when the cover is mounted. If the cover is not mounted, the first spring element blocks an insertion of the high-voltage mating plug. When the cover is not mounted, the high-voltage mating plug consequently abuts against the first spring element before the electrically conductive contact can be established between the high-voltage plug and the high-voltage mating plug. The first spring element is pushed down when installing the cover; thus enabling the high-voltage mating plug to be inserted. According to the invention, a complex sensor technology for detecting the position of the cover is not required. As soon as the cover has been mounted, the first spring element is pushed down and the high-voltage mating plug can be inserted. The high-voltage plug is used to connect the power electronics in the housing to a high-voltage source or to a high-voltage consumer. In particular if a high-voltage consumer is connected via the high-voltage plug, the high-voltage plug comprises a wire pair (also: pilot cable pair) which is short-circuited to the high-voltage mating plug. As a result, the insertion and removal of the high-voltage mating plug can be detected in a simple manner.

Provision is made in a preferable manner for the first spring element to comprise a hook at a free end. This hook is especially bent in a U-shaped manner. The hook serves as a stop for the high-voltage mating plug and therefore to block the insertion of the high-voltage mating plug.

In a preferred manner, the spring device comprises at least two first spring elements. The two first spring elements can be moved independently of one another, are, however, simultaneously pushed down by the cover. The advantage of these two first spring elements which can be moved independently of one another is that a manipulation can for the most part be ruled out because both first spring elements would have to be simultaneously pushed down by hand in order to insert the high-voltage mating plug without the cover being mounted.

The spring device comprises at least one second spring element. The second spring element is disposed in such a way that it blocks the mounted cover. The cover can therefore only be dismounted by manipulating the second spring element. In order to dismount the cover, the second spring element is manually, for example by hand, manipulated. After removing the high-voltage mating plug, the power electronics in the housing can be subjected to voltage for a few seconds. The use of the second spring element ensures that the dismounting of the cover requires at least a few seconds.

The spring device is particularly a stamped/bent sheet metal part. In a particularly preferred manner, the entire spring device is manufactured as a single piece.

In addition, provision is made in a preferable manner for the high-voltage plug to be disposed in an insertion direction in order to facilitate insertion of the high-voltage mating plug. The spring device comprises at least one supporting wall for blocking a movement of the mounted cover. The supporting wall is arranged such that a movement of the mounted cover opposite to the direction of insertion is blocked. Particularly if the cover is mounted by means of a simple hinge, for example an eyelet in which a lip is inserted, the supporting wall ensures that the cover can only be tilted but not removed.

In addition, the spring device comprises in a preferred manner lateral protective walls. These lateral protective walls ensure that it is relatively difficult to gain access to the at least one first spring element. In this way, an undesirable manipulation of the spring device is prevented.

In a preferred manner, the cover comprises a bracket which engages around the high-voltage mating plug. This bracket ensures that the cover cannot be dismounted when the high-voltage mating plug is inserted because said high-voltage mating plug blocks the bracket of the cover. Within the scope of the invention, this bracket is simultaneously used to press the first spring element down.

The cover is preferably connected to the housing by means of a hinge.

BRIEF DESCRIPTION OF THE DRAWINGS

An exemplary embodiment of the invention is described below in detail with reference to the accompanying drawings. In the drawings.

DETAILED DESCRIPTION

A high-voltage arrangement 1 according to one exemplary embodiment is described below in detail with the aid of FIGS. 1 to 5.

Figure 1:
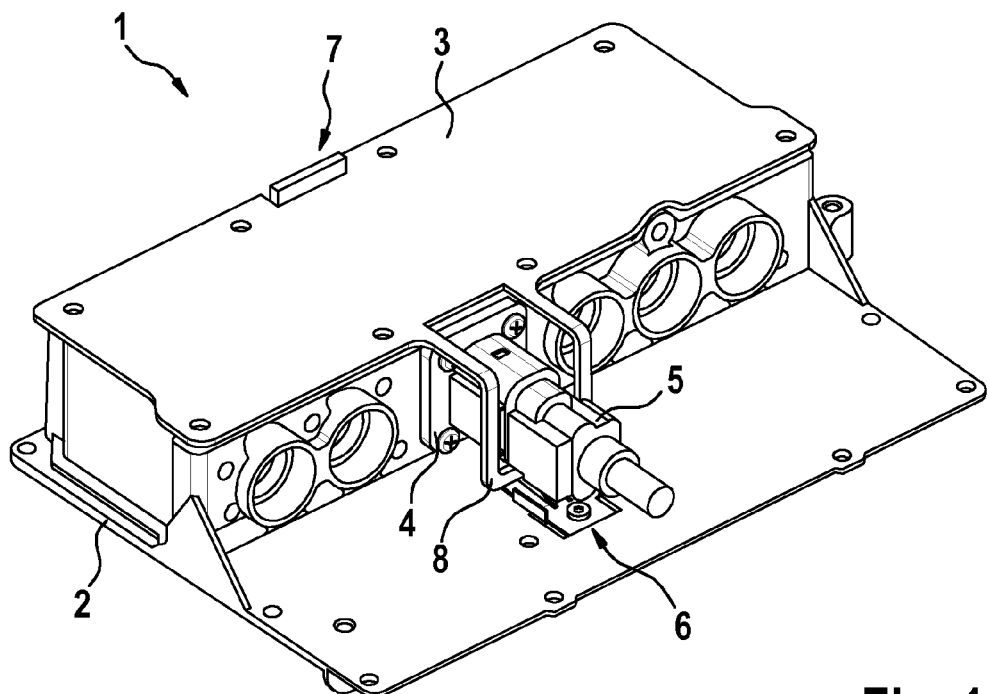
FIG. 1 shows an inventive high-voltage arrangement according to an exemplary embodiment comprising a mounted cover.

According to FIG. 1, the high-voltage arrangement 1 comprises a housing 2 which is closed by means of a cover 3. A high-voltage plug 4 is configured on the housing 2. This high-voltage plug 4 is used for the insertion of a high-voltage mating plug 5.

Power electronics, which are connected via the high-voltage mating plug 5 to a high-voltage consumer, are situated in the housing 2. The high-voltage arrangement 1 comprises a spring device 6 in order to ensure the power electronics are switched off when the cover 3 is dismounted.

The cover 3 is connected to the housing 2 by means of a hinge 7. The cover 3 is mounted in the state which is depicted. When the cover 3 is opened by means of the hinge 7, the resulting state is referred to as a dismounting of the cover.

In addition, the cover 3 comprises a bracket 8. This bracket 8 engages around the high-voltage mating plug 5. As long as the high-voltage mating plug 5 is inserted in the high-voltage plug 4, the cover 3 cannot be dismounted because the bracket 8 is blocked by the high-voltage mating plug 5.

It must, however, also be ensured that the high-voltage mating plug 5 cannot be inserted into the high-voltage plug 4 as long as the cover 3 is not correctly mounted.

Figure 2:
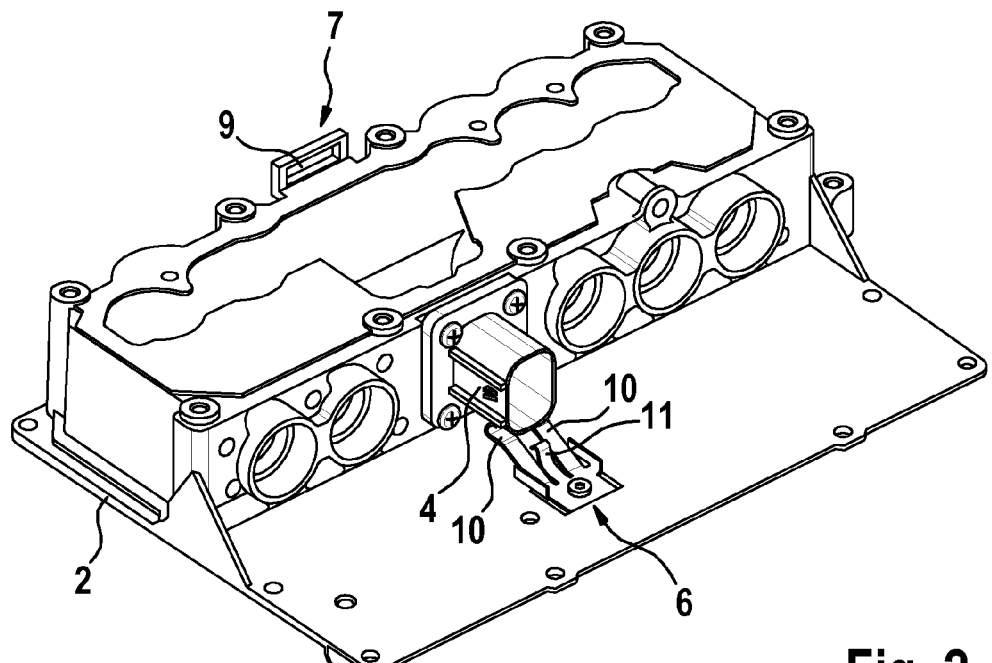
FIG. 2 shows the inventive high-voltage arrangement according to the exemplary embodiment without cover.

FIG. 2 shows the high-voltage arrangement 1 with a dismounted cover 3 and a high-voltage mating plug 5 that has been removed. As can well be seen in FIG. 2, the spring device 6 comprises two parallel first spring elements 10 and a second spring element 11 which is situated between the two first spring elements 10. The spring device 6 is preferably manufactured as a stamped/bent sheet metal part.

FIG. 2 furthermore shows the configuration of the hinge 7. Said hinge comprises an eyelet 9 which is fixed to the housing and in which a corresponding lip of the cover 3 can be inserted.

Figure 3:
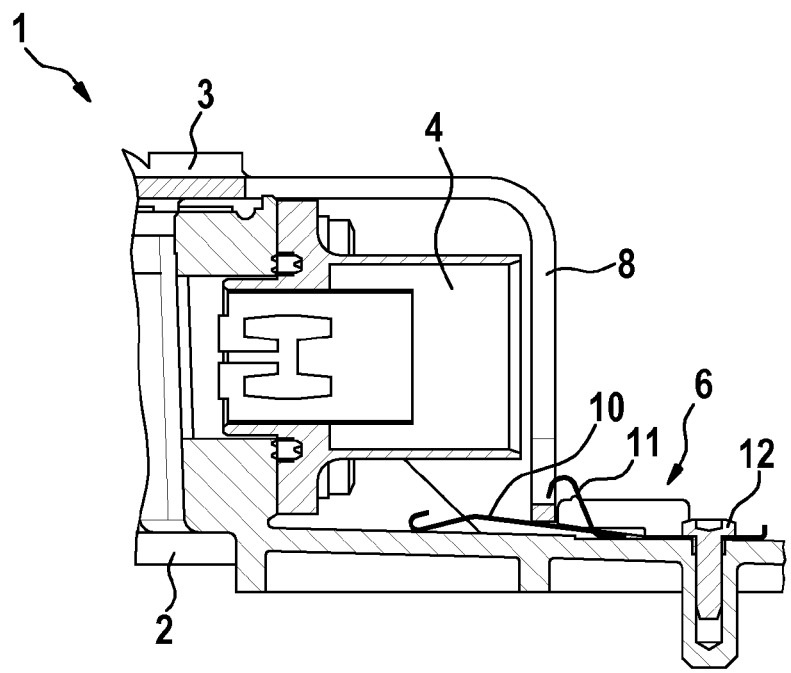
FIG. 3 shows a cross-sectional view of the inventive high-voltage arrangement according to the exemplary embodiment.
Figure 4:
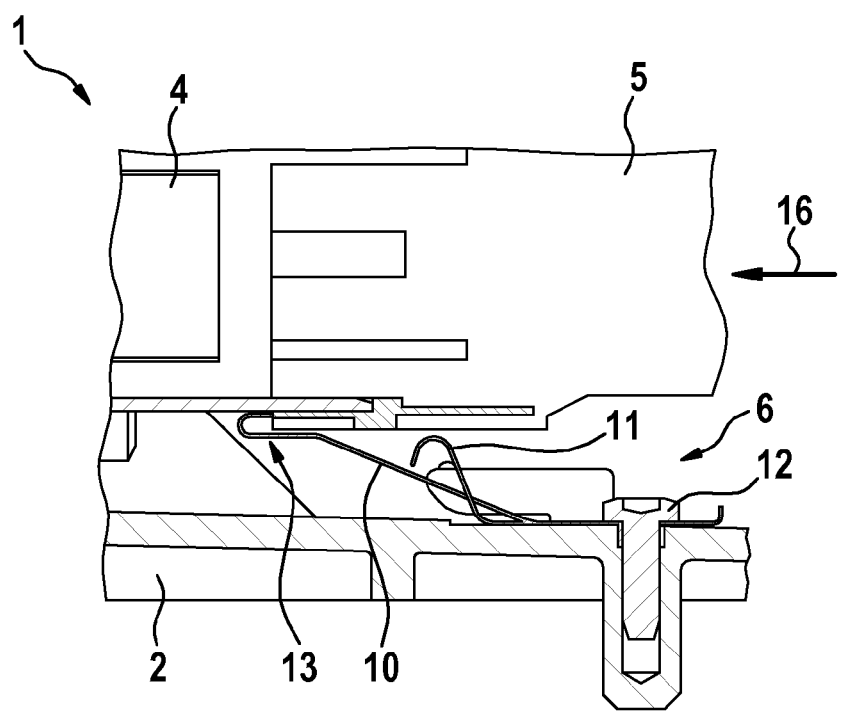
FIG. 4 shows a further cross-sectional view of the inventive high-voltage arrangement according to the exemplary embodiment.

FIG. 3 shows a cross section through the high-voltage arrangement 1, wherein the cover 3 is mounted. FIG. 4 likewise shows a cross section through the high-voltage arrangement 1, wherein the cover 3 is not mounted in FIG. 4 and the attempt is made to insert the high-voltage mating plug 5.

The first spring elements 10 each have a hook 13 on the free ends thereof. This hook 13 is U-shaped in design. When the cover 3 is dismounted as shown in FIG. 4, the hooks 13 prevent an insertion of the high-voltage mating plug 5 in the direction of insertion 16. The first spring elements 10 are only then pushed down by means of the bracket 8 when the cover 3 is mounted. In this state, an insertion of the high-voltage mating plug 5 is possible.

FIG. 3 furthermore shows the function of the second spring element 11. The second spring element 11 holds down the mounted cover 3. Even when the high-voltage mating plug 5 has been removed, the cover 3 can only then be dismounted respectively opened if the second spring element 11 is manipulated, for example by hand. This function ensures that, after the high-voltage mating plug 5 has been withdrawn, a certain amount of time, namely that time required to manipulate the second spring element 11, has elapsed before the cover 3 can be completely dismounted. In so doing, sufficient time is provided for the power electronics to be deenergized.

In addition, FIG. 3 shows a screw connection 12 for fixing the spring device 6 to the housing 2.

Figure 5:
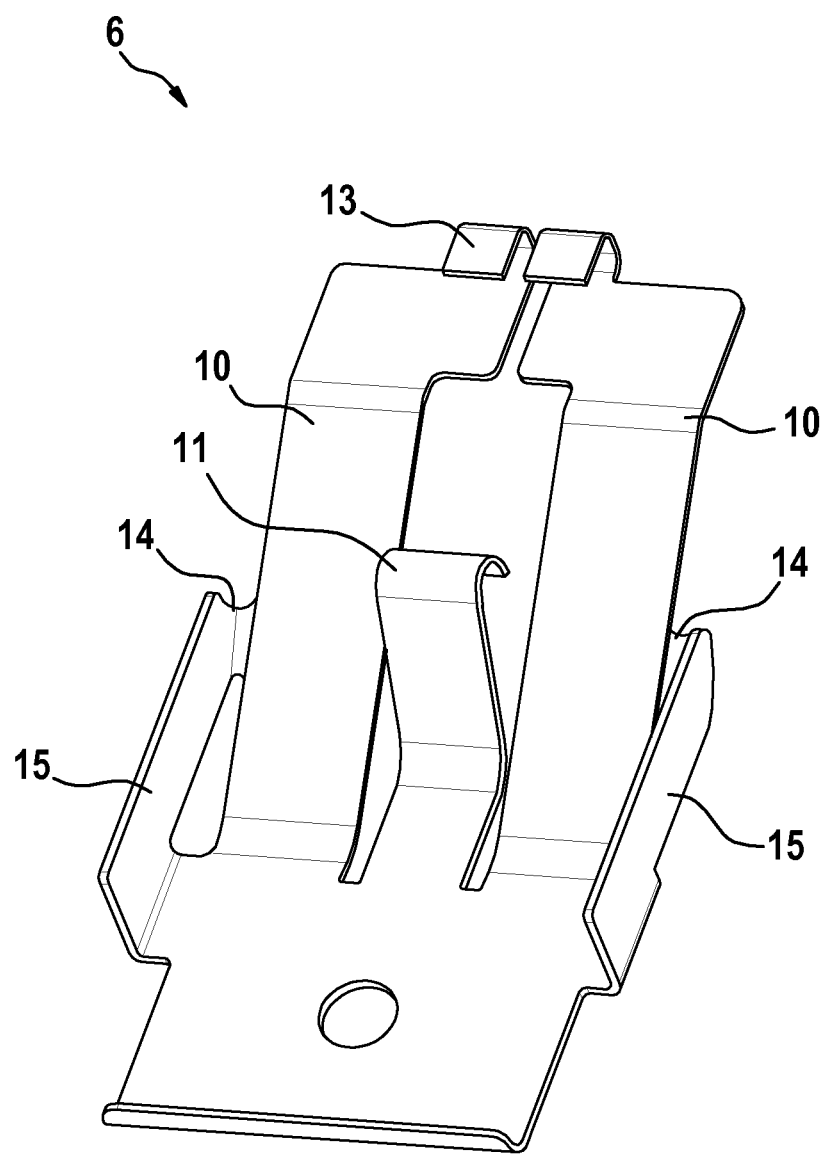
FIG. 5 shows a spring device of the inventive high-voltage arrangement according to the exemplary embodiment.

FIG. 5 shows the spring device 6 in detail. The spring device 6 has two supporting walls 14. In the mounted state, the cover 3 cannot be moved in the opposite direction to the insertion direction 16. As a result, it is ensured that the cover 3 can only be opened and not, for instance, withdrawn from the eyelet 9. In addition, FIG. 5 shows two lateral protective walls 15 on the spring device 6. These lateral protective walls 15 make access to the first spring elements 10 more difficult and thus prevent an undesirable manipulation.

The invention claimed is:

1. A high-voltage arrangement (1) comprising:
   a housing (2) defining a compartment for power electronics,
   a high-voltage plug (4) arranged on the housing (2) for the insertion of a high-voltage mating plug (5), the high-voltage plug being configured to be connected to the power electronics,
   a cover (3) configured to be mounted on the housing (2) and dismounted therefrom, wherein the compartment is accessible when the cover (3) is not mounted on the housing (2), and wherein the cover (3) prevents access to the compartment when the cover (3) is mounted on the housing (2), and
   a spring device (6) comprising at least one first spring element (10), wherein when the cover (3) is not mounted on the housing (2), the first spring element (10) blocks the high-voltage mating plug (5) from being inserted into the high-voltage plug (4), and when the cover (3) is mounted on the housing (2), the cover (3) pushes said first spring element (10) down so as to enable the high-voltage mating plug (5) to be inserted into the high-voltage plug (4).

2. The high-voltage arrangement according to claim 1, characterized in that the first spring element (10) comprises a hook (13) at a free end thereof for blocking the high-voltage mating plug (5).

3. The high-voltage arrangement according to claim 2, characterized in that the spring device (6) comprises at least two first spring elements (10) configured to be moved independently of one another.

4. The high-voltage arrangement according to claim 3, characterized in that the spring device (6) comprises at least one second spring element (11), wherein the second spring element (11) blocks the cover (3), when mounted on the housing, and said cover (3) is configured to be dismounted from the housing by manipulating the second spring element (11).

5. The high-voltage arrangement according to claim 4, characterized in that the spring device (6) is a stamped or bent sheet metal part.

6. The high-voltage arrangement according to claim 5, characterized in that the high-voltage plug (4) for insertion of the high-voltage mating plug (5) is disposed in an insertion direction (16), wherein the spring device (6) comprises at least one supporting wall (14) for blocking a movement of the cover (3), when the cover is mounted on the housing, in a direction opposite to the insertion direction (16).

7. The high-voltage arrangement according to claim 6, characterized in that the spring device (6) comprises lateral protective walls (15) configured to prevent a manipulation of the first spring element (10).

8. The high-voltage arrangement according to claim 7, characterized in that the cover (3) comprises a bracket (8) that engages around the high-voltage mating plug (5), the bracket (8) being disposed to push down the first spring element (10).

9. The high-voltage arrangement according to claim 8, characterized in that the cover (3) is connected to the housing (2) by means of a hinge (7).

10. The high-voltage arrangement according to claim 1, characterized in that the spring device (6) comprises at least two first spring elements (10) configured to be moved independently of one another.

11. The high-voltage arrangement according to claim 1, characterized in that the spring device (6) comprises at least one second spring element (11), wherein the second spring element (11) blocks the cover (3), when mounted on the housing, and said cover (3) is configured to be dismounted from the housing by manipulating the second spring element (11).

12. The high-voltage arrangement according to claim 1, characterized in that the spring device (6) is a stamped or bent sheet metal part.

13. The high-voltage arrangement according to claim 1, characterized in that the spring device (6) comprises lateral protective walls (15) configured to prevent a manipulation of the first spring element (10).

14. The high-voltage arrangement according to claim 1, characterized in that the cover (3) is connected to the housing (2) by means of a hinge (7).

15. The high-voltage arrangement according to claim 1, characterized in that the first spring element (10) comprises a U-shaped hook (13) at a free end thereof for blocking the high-voltage mating plug (5).

16. A high-voltage arrangement (1) comprising:
a housing (2),
a high-voltage plug (4) arranged on the housing (2) for the insertion of a high-voltage mating plug (5),
a cover (3) configured to be mounted on the housing (2) and dismounted therefrom, and
a spring device (6) comprising at least one first spring element (10), wherein when the cover (3) is not mounted on the housing (2), the first spring element (10) blocks the high-voltage mating plug (5) from being inserted into the high-voltage plug (4), and when the cover (3) is mounted on the housing (2), the cover (3) pushes said first spring element (10) down so as to enable the high-voltage mating plug (5) to be inserted into the high-voltage plug (4),
wherein the high-voltage plug (4) for insertion of the high-voltage mating plug (5) is disposed in an insertion direction (16), wherein the spring device (6) comprises at least one supporting wall (14) for blocking a movement of the cover (3) when the cover is mounted on the housing, in a direction opposite to the insertion direction (16).

17. A high-voltage arrangement (1) comprising:
a housing (2),
a high-voltage plug (4) arranged on the housing (2) for the insertion of a high-voltage mating plug (5),
a cover (3) configured to be mounted on the housing (2) and dismounted therefrom, and
a spring device (6) comprising at least one first spring element (10), wherein when the cover (3) is not mounted on the housing (2), the first spring element (10) blocks the high-voltage mating plug (5) from being inserted into the high-voltage plug (4), and when the cover (3) is mounted on the housing (2), the cover (3) pushes said first spring element (10) down so as to enable the high-voltage mating plug (5) to be inserted into the high-voltage plug (4),
wherein the cover (3) comprises a bracket (8) that engages around the high-voltage mating plug (5), the bracket (8) being disposed to push down the first spring element (10).

\* \* \* \* \*